INVENTOR.
EWARD CECIL WOODCOCK

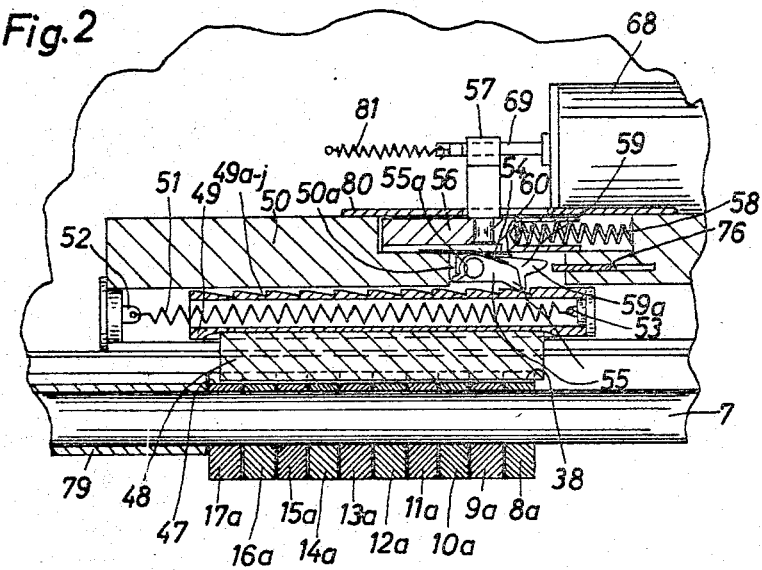
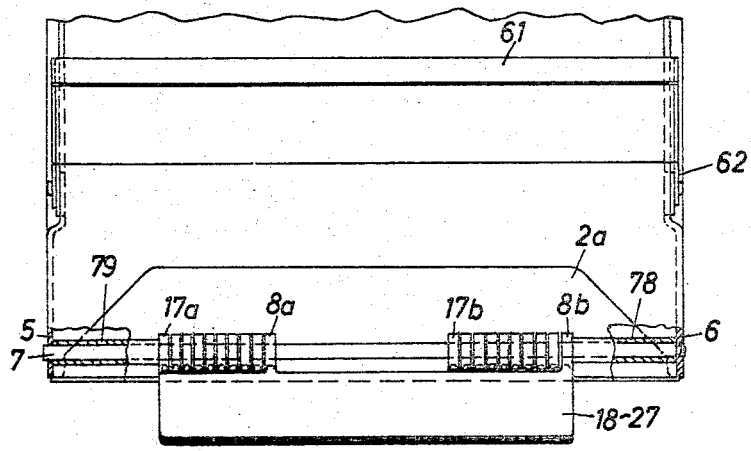

United States Patent Office 3,287,012
Patented Nov. 22, 1966

3,287,012
SHEET DISPENSERS SUCH AS CASSETTES FROM WHICH SHEETS OF X-RAY FILM ARE ADAPTED TO BE DISPENSED
Edward Cecil Woodcock, Pinner, Middlesex, England, assignor to Agfa Aktiengesellschaft, Leverkusen, Germany
Filed Dec. 3, 1964, Ser. No. 415,652
20 Claims. (Cl. 271—18)

The present invention relates to sheet dispensers.

More particularly, the present invention relates to sheet dispensers such as cassettes which contain sheets of X-ray film which are to be dispensed one after the other out of the cassette.

Containers of this latter type are adapted to be placed in a suitable receiving means which in the case of a cassette containing X-ray film is a developing apparatus for developing the X-ray film, and an apparatus of this latter type includes sheet transporting structure such as co-operating pairs of rollers which advance the sheets. Thus, in the case of X-rays such rollers advance the film through the several treating baths so as to develop and fix the film. Structures of this latter type require the container to be introduced into the developing machine in darkness, so that at least that part of the developing machine which receives the cassette is required to be closed off from any light.

Of course, it is already known to situate exposed sheets of X-ray film in light-tight envelopes or in individual cassettes which are then mounted in a suitable magazine which is placed on the developing machine, but such constructions require extremely complicated and expensive apparatus for opening the individual cassettes. Furthermore, the complicated operations required to open such cassettes each of which contains only one sheet of film renders the output of the developing machine undesirably low.

It is therefore a primary object of the present invention to provide a sheet dispenser which will avoid the above drawbacks.

In particular, it is an object of the invention to provide a sheet dispenser which can rapidly dispense sheets, such as sheets of X-ray film, from a container, such as a cassette, one after the other, so that in this way a high output can be achieved.

In addition, it is an object of the invention to provide a structure of the above type which is quite simple and which does not require any light-tight envelopes or the like for the exposed sheets. While it is required that the container of the invention be loaded in a dark room, in the case where the container of the invention is used as a cassette for sheets of exposed X-ray film, this requirement is not an inconvenience because the dark room can be the same one which is required in any event for the purpose of loading the camera. With the structure of the present invention, however, the developing machine itself need not be situated in a dark room.

One of the problems encountered in apparatus of the above type is that a plurality of sheets tend to adhere to each other so as to inhibit free movement of the sheets one after the other out of the container, and in accordance with a further object of the present invention an apparatus is provided for overcoming the tendency of the sheets to adhere to each other so as to reliably release them one after the other for movement through an apparatus such as a developing machine in the case of photographic film which must be developed.

Yet another object of the present invention is to provide a structure of the above type which is capable of handling sheets of different lengths even when the sheets of different lengths are situated in the same container.

In addition, it is an object of the invention to provide a structure which will automatically respond to the particular length of the sheets which are discharged from the container to initiate the operation of the structure for releasing the next sheet from the container, so that even though sheets of different length are situated in the same container nevertheless with the structure of the invention these sheets will be reliably discharged from the container in sequence without any overlapping of the sheets, for example.

Yet another object of the present invention is to provide an apparatus of the above type which is capable of mounting the container in a receiving apparatus at an attitude where the sheets will simply fall by gravity out of the container, so that no special structure is required to initiate the movement of the sheets from the interior of the container.

Furthermore, it is an object of the present invention to provide for a container such as a cassette which contains exposed X-ray film a structure which will maintain the cassette closed in a light-tight manner until the cassette is in a proper position in a machine such as a developing machine, the structure of the invention then being capable of automatically opening the container in such a way as to release the exposed sheets therefrom without risking undesirable exposure of the sheets to light.

Yet another object of the present invention is to provide for a container of the above type a closure means which while having a closed position capable of closing the container in a light-tight manner also has not only an open position for releasing sheets from the container but in addition a loading position where the closure means is out of the way so as to provide convenient loading of the container with the sheets which are to be subsequently dispensed therefrom.

In addition, the objects of the present invention include the provision of a structure capable of actuating the sheet discharging means in a stepwise manner for releasing the sheets one after the other from the container while at the same time requiring no particularly high accuracy in the construction of the parts, so that the cost of the structure of the invention is maintained quite low because there is no necessity for a high degree of accuracy in the manufacture of the components.

The objects of the present invention furthermore include the provision of a structure which is capable of dispensing sheets one after the other in such a manner that even though the sheets are of different lengths nevertheless they will be arranged in sequence without any overlapping and at the same time with almost no gap between the successive sheets which are dispensed from the container.

With the above objects in view the invention includes a container such as a cassette which is adapted to contain a plurality of sheets of X-ray film, this container of the invention carrying a discharge means for discharging a plurality of sheets one after the other from the interior of the container, and a receiving means is provided for receiving the container so as to maintain the latter in an attitude where the sheets will be successively discharged therefrom by the discharge means of the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a transverse fragmentary section taken along line 2—2 of FIG. 1 in the direction of the arrows and showing the structure for releasing the sheets one after the other for discharge from the container; and FIG. 3 is a fragmentary elevation showing the container of the invention in an open position, FIG. 3 showing that part of the container from which the sheets are dispensed.

Figure 1:
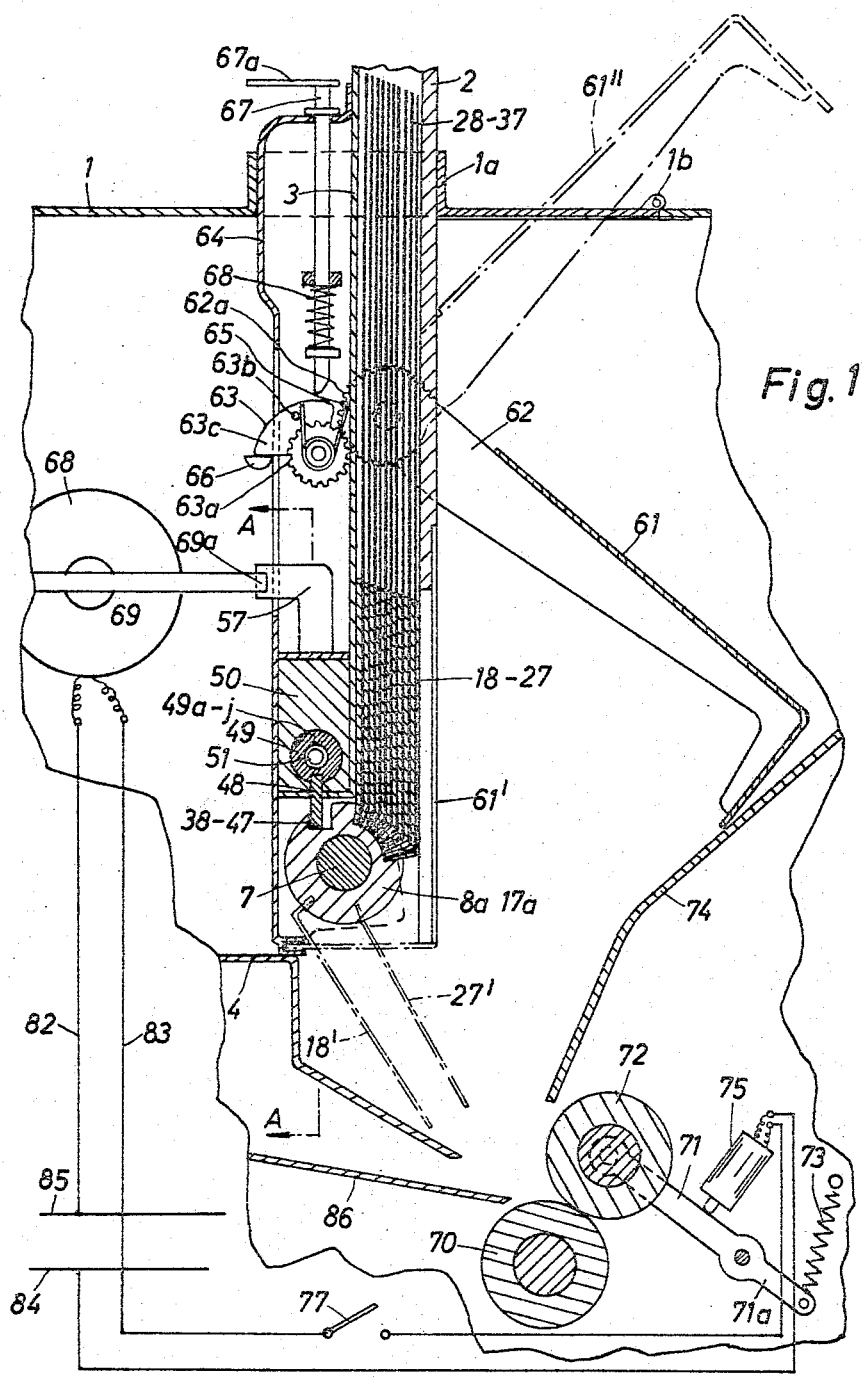
FIG. 1 is a fragmentary sectional elevation of one possible embodiment of a structure of the invention, FIG. 1 showing a cassette loaded with sheets and situated in a developing machine with only that part of the developing machine which cooperates with the container being shown in FIG. 1.

Referring now to FIG. 1, there is shown therein part of a housing 1 of a developing machine which is adapted to develop exposed X-ray film in a manner well known in the art. The housing 1 is formed with an inlet 1a partly movable in a joint 1b through which a cassette of the invention is adapted to be introduced into the developing machine 1, so that the machine 1 forms a receiving means capable of receiving and supporting the cassette in the manner shown in FIG. 1 and described below. The cassette or container of the invention includes a wall 2 which extends vertically in FIG. 1 but which forms the bottom wall of the container when the latter is not received by the receiving means 1, and the container also includes a wall 3 which extends vertically in FIG. 1 but which normally forms the top wall of the container. The cassette 2, 3 rests on a wall 4 in the interior of the machine 1, this wall 4 forming part of a guide means for guiding sheets along the interior of the developing machine, and the container 2, 3 is guided into the machine 1 and held therein in the position illustrated in FIG. 1 through a known structure which forms no part of the present invention and is not illustrated or described.

As may be seen from FIG. 3, the container of the invention includes, in addition to the bottom wall 2 and the top wall 3, side walls 5 and 6. A discharge means is carried by the container for discharging sheets one after the other from the interior thereof, and this discharge means includes an elongated shaft 7 which is carried by the walls 5 and 6 and extends across the interior of the container 2, 3. This discharge means further includes a plurality of rings 8a–7a situated next to each other on the shaft 7 and freely turnable thereon, as well as a second plurality of rings 8b–17b also situated next to each other and surrounding and carried by the shaft 7 so as to be freely turnable thereon. A plurality of separator plates 18–27 are carried by these rings for free rotary movement relative to the shaft 7. Thus, the separator plate 18 is fixed to the rings 8a and 8b for turning movement with the latter, and the next plate 19 is connected to the rings 9a and 9b, and so on until the final plate 17 is connected to the rings 17a and 17b, and while the plates have portions which are offset so as to be connected to the several rings in the manner described above, the plates themselves are in alignment with each other, as is apparent from FIG. 3. The plates 18–27 are shown in their sheet-releasing positions in FIG. 3 while in FIG. 1 these plates are shown in sheet-retaining positions where they retain sheets 28–37 separated from each other and situated in the interior of the container 2, 3. These sheets 28–37 may of course be sheets of exposed film, and the separator plates 18–27 are respectively situated between the sheets 28–37 so that to maintain the latter separate from each other. In the sheet-retaining positions shown in FIG. 1, the several plates 18–27 extend parallel to each other and they are spaced from each other by a distance equal to the maximum thickness of the sheets of film. As is apparent from FIG. 1, the several separator plates 18–27 have angularly bent portions fixed to the several rings, and these portions are bent to different extents so that the plates will extend parallel to each other in their sheet-retaining positions, as is apparent from FIG. 1. Each of the separator plates 18–27 can be made of sheet metal having a thickness on the order of only a few tenths of a millimeter, so that where ten such plates are provided, the total thickness of the container need only be a few millimeters greater than the total thickness of the sheets of film or the like which are situated therein to be dispensed therefrom. As may be seen from FIG. 3, the shaft 7 carries a pair of spacer sleeves 78 and 79 situated between the side walls of the container and the groups of rings so as to prevent movement of the rings along a shaft 7. The rings directly engage each other and are thus constrained for movement only in rotation about the shaft 7.

The several rings 8a–17a have peripheries which are respectively formed with notches 38–47, and when the several separator plates 18–27 are in their sheet-retaining positions shown in FIG. 1, all of these notches 38–47 are in alignment, and an elongated lock bar 48 extends into the row of notches 38–47 so as to prevent the rings 8a–7a from turning in a clockwise direction, as viewed in FIG. 1, and in this way the several separator plates 18–27 are retained in their sheet-retaining positions shown in FIG. 1. According to one of the features of the invention the shaft 7, as is particularly apparent from FIG. 1, is displaced from the planes in which the plates 18–27 are situated when they are in their sheet-retaining positions, so that as a result these plates will tend to turn by gravity in a clockwise direction, as viewed in FIG. 1.

A moving means is operatively connected to the lock bar 48, which extends parallel to the shaft 7, for moving the lock bar 48 longitudinally in a stepwise manner along the row of rings 8a–17a shown in FIG. 2, so that in this way the rings will be successively released for turning movement relative to the shaft 7, and this moving means includes an elongated rack 49 extending longitudinally of and fixed to the lock bar 48 and provided with a series of ratchet teeth 49a–j, as is shown in FIG. 2. The top wall 3 of the container carries a supporting block 50 formed with an elongated bore which receives the rack 49 so as to support the latter for longitudinal movement, and the lock bar 48 extends through an elongated slot of the block 50 from the rack 49 to which the bar 48 is fixed, as is apparent from FIGS. 1 and 2. One end of the bore of the block 50 which receives the rack 49 is closed by a plug 52, and the rack 49 itself is formed with an axial bore which is closed by a plug 53. An elongated spring 51 extends between and is fixed to the plugs 52 and 53, this spring 51 being under tension so as to urge the rack 49 to the left, as viewed in FIG. 2.

The moving means for moving the lock bar 48 in a stepwise manner further includes a shiftable member 56 supported for movement by the block 50 and pivotally carrying a pawl 55 which is urged into engagement with the teeth 49a–j by a small leaf spring 54 which is carried by the shiftable member 56. This shiftable member 56 fixedly carries a projecting actuating member 57 which projects from the member 56 into the path of movement of an armature of an electromagnet, as will be apparent from the description below. A spring 58 is compressed in the recess of block 50 which receives the shiftable member 56 and this spring 58 urges the shiftable member 56 and all of the structure carried thereby to the left, as viewed in FIG. 2. The block 50 carries over the recess which receive the shiftable member 56 a guide plate 80 formed with an elongated slot through which the actuating member 57 extends, and the length of this slot determines the extent of movement of the shiftable member 56.

A holding pawl 59 also cooperates with the teeth 49a–j to prevent return movement of the rack 49 once it is advanced by the pawl 55 through a given increment, as will be apparent from the description below, and the holding pawl 59 is supported for turning movement directly by the block 50 so that it does not shift with the shiftable member 56, and a small leaf spring 60 engages the holding pawl 59 to urge the tooth thereof downwardly into engagement with the teeth of the rack 49. The holding pawl 59 has a front camming end portion 59a located in the path of movement of a manually operable control member 76 which is fixed to an extension which is not shown and which is accessible to the operator, so that by actuating this latter extension the operator can shift the control member 76 against the camming portion 59a of the pawl 59 to retain the latter in opposition to the spring 60 in a position raised away from the teeth 49a–j, so that in this way the structure for advancing the rack 49 can be rendered inoperative at the option of the operator, and the control member 76 is used for this purpose in connection with loading of the container 2, 3, as will be apparent from the description below.

The shiftable member 56 has a starting position at the left end of its stroke, as viewed in FIG. 2, and from this starting position the shiftable member 56 will move to the right, as viewed in FIG. 2 along a predetermined stroke, after which the shifting member 56 will be returned to the left to its starting position. The pawl 55 fixedly carries a projection 55a which engages a surface of the block 50 when the shiftable member 56 is in its starting position, and the engagement of the projection 55a with the surface of the block 50 turns the pawl 55 in a counterclockwise direction, as viewed in FIG. 2, to a position where the pawl 55 is out of engagement with the ratchet teeth 49a–j.

The wall 2 of the container 2, 3 is formed with a discharge opening 2a through which the sheets are adapted to be discharged one after the other from the interior of the container, and as is apparent from FIG. 3, this opening 2a has an upper horizontal edge, when the container has the attitude shown in FIGS. 1 and 3, and in addition the opening 2a is defined by a pair of oppositely inclined end edges extending from the upper horizontal edge downwardly to the lower corners of the wall 2, as is also shown in FIG. 3. This opening 2a not only permits the sheets to be loaded into and discharged from the interior of the container, but in addition the opening 2a is large enough to permit the separator plates 18–27 to turn freely from the interior to the exterior of the container.

In accordance with a further feature of the invention a closure means 61 is provided for closing the opening 2a in a light-tight manner, so that when the container is closed the exposed sheets or film therein, for example, will be protected from light. This closure means 61 is in the form of a cover member hingedly connected at its ends to the side walls 5 and 6 and extending across the wall 2 of the container. The cover or closure means 61 completely closes the opening 2a, and in addition it has a free edge extending into a groove formed in the container along the periphery of the lowermost part of the container in the vertical attitude thereof shown in FIGS. 1 and 3, so that by extending into this groove the closure member 61 is capable of closing the container in a light-tight manner. The groove which receives the edge of the closure member 61 is shown in FIG. 1 directly engaging the supporting roll 4 of the machine 1.

The closure means 61 has side walls 62, one of which forms a lever which is fixed to a gear 62a, or the pivotally connected end of one of the side walls 62 can be formed with gear teeth 62a, and the gear teeth 62a mesh with the teeth of a gear 63a which is supported for rotary movement by a wall of a sheet metal member 64 which is fixed to the wall 3 of the container, and this gear 63a is fixed to a lever 63 which turns with the gear 63a. It will be noted from the lower part of FIG. 1 that it is in fact a portion of the sheet metal member 64 which forms an extension of the wall 3 and which is provided with the groove which receives the edge of the closure member 61 to provide a light-tight closure of the cassette. The lever 63 which is fixed to the gear 63a for rotary movement therewith projects through a slot in the sheet metal member 64 to the exterior thereof, and FIG. 1 shows an end 63c of the lever 63 which at all times projects at least to a slight extent outwardly beyond the sheet metal member 64. A spring 65 has one end engaging a pin 63b which is fixed to the lever 63 and an opposite end engaging the wall 3 so that this spring urges the lever 63 together with the gear 63a in a counterclockwise direction, as viewed in FIG. 1, and as a result of the meshing between the gear 63a and the teeth 62a, the closure means 61 is urged by the spring 65 in a clockwise direction, as viewed in FIG. 1, to a closed position covering the opening 2a. As was indicated above, when the closure means 61 is in its closed position, the end 63c of the lever 63 still extends to a slight extent outwardly beyond the sheet metal plate 64, and as a result when the cassette is introduced into the receiving means 1, a stationary stop member 66 carried by the receiving means 1 is in the path of movement of the lever 63 and engages the projecting end 63c thereof so that after this end 63c is engaged by the stationary stop member 66 the continued downward movement of the container 2, 3 to the position illustrated in FIG. 1 produces a clockwise turning of the lever 63 and the gear 63a with respect to the container 2, 3 with the result that the closure means 61 is automatically displaced in a counterclockwise direction, as viewed in FIG. 1, from its closed position to its open position in which it is illustrated in FIG. 1. Of course, the weight of the entire container 2, 3 with all of the structure carried thereby, as well as the frictional engagement of the container by elements such as the inlet guide 1a, is sufficient to prevent turning of the lever 63 by the spring 65 from the position shown in FIG. 1 until after the container 2, 3 is removed from the receiving means 1. It is to be noted that the sheet metal member 64 which is carried by the top wall 3 has a configuration which completely fills that part of the interior of the guide member 1a which is not occupied by the container 2, 3, so that in this way the guide member 1a is completely closed to prevent light from entering into the developing machine through the guide 1a for the cassette.

When the container of the invention is empty and not connected to the receiving means 1a, it is loaded in a dark room, as pointed out above, and in order to render the loading of the container as convenient as possible, the closure means 61 is turnable from its closing position 61' indicated in FIG. 1 through and beyond its open position shown in solid lines in FIG. 1 to a loading position 61'' indicated in FIG. 1, and the sheet metal member 64 carries a means for releasably holding the closure means 61 in its loading position 61''. This releasable holding means includes an elongated rod 67 guided for longitudinal movement by suitable bearings and urged by a spring 68 into engagement with the lever 63, a suitable handle 67a being accessible at the exterior of the container for enabling the operator to displace the rod 67 in opposition to the spring 68. When the closure means 61 is displaced to the dot-dash line position 61'', the end 63c of the lever 63 will turn past the free end of the holding rod 67 so that the spring 68 will then advance the holding rod 67 to a position engaging the free end 63c of the lever 63, so that in this way the closure means 61 will be retained in the loading position 61'' so as to render the loading of the container extremely convenient. After the container is loaded the operator need only pull on the handle 67a so as to release the closure means 61 to the force of the spring 65 which turns the closure means 61 to its closed position.

The receiving means 1 which receives the container 2, 3 of the invention not only supports the container in a proper position for release of the sheets successively therefrom, but in addition the receiving means carries an actuating means which actuates the moving means which moves the lock bar 48 in a stepwise manner as referred to above. This actuating means includes an electromagnet 68 fixedly carried by the machine 1 and having an armature 69 which is urged to the left, as viewed in FIG. 2 to a predetermined rest position by a spring 81. This armature 69 has a lateral projection 69a, and when the electromagnet 68 is energized the armature 69 is pulled to the right, as viewed in FIG. 2, and the actuating member 57 is situated in the path of movement of the lateral projection 69a of the armature 69, so that this projection 69a engages the actuating member 57 and moves the latter together with the shiftable member 56 to the right, as viewed in FIG. 2 in opposition to the spring 58, and in this way the rack 49 together with the bar 48 will be advanced through a given increment each time the electromagnet 68 is energized. The stroke of the shiftable member 56 is such that at each increment of movement of the lock bar 58 this lock bar is moved through a distance which is approximately equal to the thickness of each of the rings 8a–17a. However, in view of the fact that these rings have quite a substantial thickness, it is not necessary to construct the components shown in FIG. 2 with a high degree of accuracy.

Referring now to FIG. 1, the machine 1 includes a sheet-transporting roll 70 supported for rotation about its axis and driven by any suitable structure so that when a sheet of film engages the roll 70 the sheet of film will be advanced along the interior of the sheet 1, and a counter roll 72 is located over and cooperates with the roll 70 for engaging a sheet and transporting the latter during rotation of the roll 70. This counter roll 72 is supported for free rotation by the free end of a lever 71 which is supported for pivotal movement on a suitable stationary shaft of the machine 1, the lever 71 having an arm 71a connected to a spring 73 which urges the lever 71 in a counterclockwise direction, as viewed in FIG. 1, so that the roll 72 is urged toward the roll 70. The roll 72 is situated in part behind a guide member 74 made of sheet metal and forming part of the machine 1. A further sheet-guiding member 86 is carried by the machine 1 and is made of sheet metal, for example. This guide sheet 86 serves to guide sheets which are manually introduced into the machine at the option of the operator, but of course when the structure is used for development of exposed X-ray film, for example, it is essential with such an operation to locate at least the receiving end of the machine in a dark room.

The structure for energizing the electromagent 68 includes a microswitch 75. The microswitch 75 is normally closed and when the lever 71 turns in a clockwise direction through a very slight distance resulting from raising of the roller 72 by a sheet which passes between the roller 72 and the roller 70, the lever 71 turns through a sufficient distance to actuate the microswitch 75 so as to open the circuit when a sheet is received between the rollers 72 and 70. Of course, the microswitch 75 is shown for the sake of convenience in the position illustrated in FIG. 1, and in an actual construction the lever 71 may have an extension which is engaged by the microswitch and which has a sufficient extent of movement in response to receiving of a sheet between the rollers 70 and 72 in order to provide the desired actuation of the switch 75. As soon as the trailing end of a sheet moves beyond the rollers 70 and 72 the roller 72 is urged back to its initial position by the spring 73, and the microswitch 75 again closes the circuit. This microswitch 75 is connected by a pair of conductors 82 and 83 to the electromagnet 68, and these conductors are connected to the lines 84 and 85 in a manner shown diagrammatically in FIG. 1, the circuit further including a main switch 77 which is closed whenever it is desired to operate the apparatus shown in FIG. 1. This switch 77 will of course remain closed during the entire operations, so that whenever a sheet moves beyond the rollers 70 and 72 the microswitch 75 will be automatically closed so as to energize the electromagnet 68 which remains energized until a sheet is received at its leading end between the rollers 70 and 72, whereupon the microswitch 75 opens so as to deenergize the electromagnet 68. The switch 77 is of course in series with the microswitch 75.

The above-described structure operates as follows:

When the last sheet was released from the container 2, 3, the lock bar 48 was moved to the right, as viewed in FIG. 2, beyond the ring 8a, and of course the holding pawl 59 retains the lock bar 48 in this end position where the spring 51 is under maximum tension. The container has of course been removed from the machine and in a suitable dark room it is loaded with the exposed sheets of X-ray film. For this purpose the operator will actuate the control member 76 so as to engage the camming portion 59a of the holding pawl 59, so that this holding pawl will be raised away from the ratchet teeth 49a–j, and of course the pawl 55 is automatically raised away from the teeth by engagement of its end portion 55a with the surface of the block 50, as pointed out above. Therefore, when the operator actuates the control 76 the lock bar 48 will be released to the spring 51 which will only be capable of moving the lock bar until its left end, as viewed in FIG. 2, engages the right face of the ring 8a shown in FIG. 2, since in the release position to which the separating plate 18 swung when the last sheet was discharged, the notch 38 of the ring 8a is displaced out of alignment with the lack bar 48.

Now the operator will insert the first sheet into the container, placing it in engagement with the wall 3, whereupon the operator will turn the plate 18 against this first sheet, and thus the notch 38 of the plate 18 will come into alignment with the lock bar 48 which will be moved automatically by the spring 51 into the notch 38 and the lock bar 48 will now, at its left end, as viewed in FIG. 2, engage the next ring, namely the ring 9a which is next to the ring 8a. Then the second sheet will be placed in the container and this second sheet will of course engage the plate 18 which has already been moved to its sheet-retaining position, so that this plate 18 will maintain the first two sheets separate from each other, and after the second sheet has been introduced into the container the operator will turn the next separating plate 19 to its sheet-retaining position, so that in this way the notch of the ring 9a will become aligned with the lock bar 48 which will be automatically advanced by the spring 51 into engagement with the third ring. In this way the operations are repeated until the final sheet is in the container and the final plate 17 has been moved into the container so that the rings and lock bar have the position shown in FIG. 2. Sheets of different length will extend to different distances along the interior of the container 2, 3 without in any way influencing the function of the apparatus as a result of the different lengths of the sheets. While the specific example disclosed is adapted to handle ten sheets, it is of course possible to provide any desired number of sheets.

Assuming now that all of the sheets are in the container, the operator will manually engage the handle 67a so as to release the closure means 61 for movement through its closed position where the spring 65 will hold the closure means 61 in its position light-tightly closing the container. Now the closed container is introduced into the receiving means 1 through the guide 1a, and of course the end 63c of the lever 63 will engage the stop member 66 so that the closure means 61 will be displaced to its open position shown in solid lines in FIG. 1. At the end of the movement of the container 2, 3 into the receiving means 1, the actuating member 57 is situated in the path of movement of the projection 69a of the armature 69 of the electromagnet 68. Furthermore, when the container is in the receiving means 1 it is supported in a vertical position where the several sheets are adapted to fall simply by gravity out of the container as they are successively released.

In order to start the operations the operator will now close the switch 77, and of course since there is no sheet between the rolls 70 and 72 the switch 75 is closed and the circuit is therefore closed by closing of the switch 77 so that the electromagnet 68 becomes energized and the armature 69 is pulled in opposition to the spring 81 to the right, as viewed in FIG. 2, with the result that the pawl 65 engages the first tooth 49a and advances the rack 49 together with the bar 48 through a distance sufficient to release the ring 17a and of course the plate 17 connected thereto. Of course, before the cassette was introduced into the developing machine 1 the operator has returned the control 76 to its position displaced from the camming portion 59a of the holding pawl 59. Once the ring 17a is released by the lock bar 48, this ring 17a together with the ring 17b and the plate 17 will simply swing by gravity through the discharge opening 2a into the dot-dash line position shown in FIG. 1, and now the last sheet which was introduced into the container will simply fall by gravity out of the container to be guided by the guide plates 4, 74 and 86 into the rollers 70 and 72 which engage the leading end of the first sheet to advance the latter through the machine in a well known manner. The first plate 27 simply falls by gravity to the dotted line position shown in FIG. 1 once the lock bar 48 is displaced out of the notch 47 of the ring 17a.

Of course, the movement of the first sheet between the rolls 70 and 72 raises the roll 72 and turns the lever 71 so as to open the switch 75, and now the solenoid 68 is deenergized so that the spring 81 returns the pawl 59 to its initial position and the spring 58 returns the shiftable member 56 back to its starting position so that the pawl 55 is again raised away from the teeth by engagement of the projection 55a thereof with the surface of the block 50, but of course the holding pawl 59 engages the first tooth of the rack 49 so as to prevent the return thereof by the spring 51 during the return movement of the pawl 55. In this way the pawl 55 will engage the second tooth of the rack.

As soon as the trailing end of the first sheet moves beyond the rollers 70 and 72, the spring 73 returns the roller 72 into engagement with the roller 70 which results in counterclockwise turning of the lever 71 so as to close the switch 75 which thus immediately energizes the solenoid 68 so that its armature 69 is again advanced so as to shift the shiftable member 56 for providing the next increment of movement of the lock bar 48, and now the second ring is released so that the second separator plate can swing down to its release position, and thus the second sheet will be released for movement through the machine in the same way as the first sheet, and in this way the several sheets are automatically and successively released one after the other with the structure of the invention, and it will be noted that this structure response to the lengths of the sheets so that even though the sheets have different lengths nevertheless the structure will operate reliably to automatically release the sheets one after the other at the proper moment so that they can simply fall by gravity out of the cassette and into the machine to be processed thereby.

After the last sheet has in this way moved out of the container, the operator will open the switch 77 and will remove the cassette from the machine 1, and it will be noted that this cassette is now in a condition for loading since the separator plates have already been swung to their release positions and the bar 48 has been displaced beyond the ring 8a.

While the several rings have been described above as being freely turnable with respect to the shaft 7 so that the separator plates can fall by gravity, it is of course possible, if desired, to connect to the several rings a plurality of relatively light springs, respectively, which urge the rings to turn in a direction displacing the separator plates out of the container.

With respect to the releasable holding structure for releasably holding the closure means in its loading position referred to above, it is of course possible to use instead of the above-described structure a structure such as a suitable over-center spring arrangement.

It will be understood that each of the elements described above, or two or more together, may also find a useful application in other types of sheet dispensers differing from the types described above.

While the invention has been illustrated and described as embodied in cassettes for dispensing X-ray film, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sheet dispenser, such as a cassette from which sheets of X-ray film are adapted to be dispensed, comprising, in combination, a container adapted to contain a plurality of sheets; and discharge means carried by said container for discharging sheets one after the other from the interior of said container, said discharge means including a plurality of separator plates respectively supported for pivotal movement about a common axis and having sheet retaining positions where said plates are situated in the interior of said container respectively between a plurality of sheets to maintain the latter separate from each other, said plates being turnable about said common axis from said sheet retaining positions to sheet releasing positions where said plates release sheets for movement out of the interior of said container.

2. A sheet dispenser, such as a cassette from which sheets of X-ray film are adapted to be dispensed, comprising, in combination, a container adapted to contain a plurality of sheets; and discharge means carried by said container for discharging sheets one after the other from the interior of said container, said discharge means including an elongated shaft extending across the interior of said container and a plurality of separator plates pivotally carried by said shaft for pivotal movement about a common axis and situated between sheets in said container to separate the sheets from each other.

3. A sheet dispenser, such as a cassette from which sheets of X-ray film are adapted to be dispensed, comprising, in combination, a container adapted to contain a plurality of sheets; and discharge means carried by said container for discharging sheets one after the other from the interior of said container, said discharge means including an elongated shaft extending across the interior of said container and a plurality of separator plates pivotally carried by said shaft and situated between sheets in said container to separate the sheets from each other, said container having a wall formed with a discharge opening through which the sheets are adapted to be discharged from the interior of said container, and said shaft and separator plates being situated adjacent said discharge opening for engaging end portions of sheets which are adjacent said discharge opening.

4. A sheet dispenser, such as a cassette from which sheets of X-ray film are adapted to be dispensed, comprising, a combination, a container adapted to contain a plurality of sheets; and discharge means carried by said container for discharging sheets one after the other from the interior of said container, said discharge means including an elongated shaft extending across the interior of said container and a plurality of separator plates pivotally carried by said shaft and situated between sheets in said container to separate the sheets from each other, said container having a wall formed with a discharge opening through which the sheets are adapted to be discharged from the interior of said container, and said shaft and separator plates being situated adjacent said discharge opening for engaging end portions of sheets which are adjacent said discharge opening, said separator plates being smaller than the sheets and said discharge opening being large enough to provide unhampered turning of said plates outwardly from the interior of said container through said discharge opening.

5. A sheet dispenser, such as a cassette from which sheets of X-ray film are adapted to be dispensed, comprising, in combination, a container having a wall formed with a discharge opening, said container being adapted to contain a plurality of sheets which are to be dispensed therefrom; an elongated shaft carried by said container in the interior thereof and extending across the interior of said container in the region of said discharge opening; a plurality of separator plates turnably carried by said shaft and having sheet-retaining positions where said plates are situated in the interior of said container respectively between a plurality of sheets to maintain the latter separate from each other, said plates being turnable on said shaft from said sheet retaining positions to sheet-releasing positions where said plates release sheets for movement out of the interior of said container; and release means operatively connected to said plates for sequentially releasing the latter for movement one after the other from said retaining to said sheet-releasing position so that sheets in the container will be dispensed one after the other from the interior thereof.

6. A sheet dispenser, such as a cassette from which sheets of X-ray film are adapted to be dispensed, comprising, in combination, a container having a wall formed with a discharge opening, said container being adapted to contain a plurality of sheets which are to be dispensed therefrom; an elongated shaft carried by said container in the interior thereof and extending across the interior of said container in the region of said discharge opening; a plurality of separator plates turnably carried by said shaft and having sheet-retaining positions where said plates are situated in the interior of said container respectively between a plurality of sheets to maintain the latter separate from each other, said plates being turnable on said shaft from said sheet-retaining positions to sheet-releasing positions where said plates release sheets for movement out of the interior of said container; and release means operatively connected to said plates for sequentially releasing the latter for movement one after the other from said retaining to said sheet-releasing position so that sheets in the container will be dispensed one after the other from the interior thereof, said plates when in said sheet-retaining positions thereof extending parallel to each other and being spaced from each other be a distance equal to the maximum thickness of sheets which are to be dispensed from the interior of said container.

7. A sheet dispenser, such as a cassette from which sheets of X-ray film are adapted to be dispensed, comprising, in combination, a container having a wall formed with a discharge opening, said container being adapted to contain a plurality of sheets which are to be dispensed therefrom; an elongated shaft carried by said container in the interior thereof and extending across the interior of said container in the region of said discharge opening; a plurality of separator plates turnably carried by said shaft and having sheet-retaining positions where said plates are situated in the interior of said container respectively between a plurality of sheets to maintain the latter separate from each other, said plates being turnable on said shaft from said sheet-retaining positions to sheet-releasing positions where said plates release sheets for movement out of the interior of said container; and release means operatively connected to said plates for sequentially releasing the latter for movement one after the other from said retaining to said sheet-releasing position so that sheets in the container will be dispensed one after the other from the interior thereof, said plates when in said sheet-retaining position thereof extending parallel to each other and being spaced from each other by a distance equal to the maximum thickness of sheets which are to be dispensed from the interior of said container, and said shaft being displaced from planes which are respectively occupied by said separator plates when the latter are in said sheet-retaining positions.

8. In a sheet-dispensing apparatus, such as an apparatus for dispensing sheets of X-ray film from a cassette which contains the film, in combination, a container adapted to contain a plurality of sheets which are to be dispensed therefrom; discharge means carried by said container for discharging sheets one after the other from the interior thereof, said discharge means including a plurality of separator plates respectively supported for pivotal movement about a common axis and having sheet retaining positions where said plates are situated in the interior of said container respectively between a plurality of sheets to maintain the latter separate from each other, said plates being turnable about said common axis from said sheet retaining positions to sheet releasing positions where said plates release sheets for movement out of the interior of said container; and support means for receiving said container and supporting the latter at an attitude where the sheets in the container will fall out of the latter due to the influence of gravity.

9. A sheet dispenser, such as a cassette from which sheets of X-ray film are adapted to be dispensed, comprising, in combination, a container having a wall formed with a discharge opening through which sheets are adapted to be discharged from the interior of said container; discharge means carried by said container for discharging sheets one after the other from the interior thereof; and closure means carried by said container for closing said opening thereof in a light-tight manner.

10. In a sheet-dispensing apparatus, such as an apparatus for dispensing sheets of X-ray film from the interior of a cassette, in combination, a container adapted to contain a plurality of sheets which are to be dispensed therefrom, said container having a wall formed with a discharge opening through which sheets in the container are adapted to be discharged from the container; discharge means carried by said container for discharging sheets one after the other from the interior thereof through said discharge opening; closure means carried by said container for closing said discharge opening in a light-tight manner, said closure means being carried by said container for movement from a closed position closing said opening to an open position uncovering said opening so that sheets can be discharged therethrough; receiving means for receiving said container and supporting the latter in a position where sheets are adapted to be discharged from the interior thereof; and means carried by said receiving means and coacting with said closure means for automatically displacing the latter to said open position thereof when said receiving means receives said container.

11. In an apparatus as recited in claim 10, said closure means being movable with respect to said container away from said discharge opening thereof beyond said open position to a loading position uncovering said discharge opening to an extent which renders loading of said container with sheets convenient; and releasable holding means carried by said container and engaging said closure means when the latter is in said loading position thereof for releasably holding said closure means in said loading position.

12. A sheet dispenser, such as a cassette from which a plurality of sheets of X-ray film are adapted to be dispensed, comprising, in combination, a container adapted to contain a plurality of sheets which are to be dispensed therefrom; an elongated shaft carried by said container and extending across the interior thereof; a plurality of rings surrounding and distributed along said shaft, said rings being freely turnable on said shaft and said rings respectively having outer peripheries which are respectively formed with notches; a plurality of separator plates respectively carried by said rings for turning movement therewith between sheet-retaining positions where said plates are substantially parallel to each other and are respectively situated between a plurality of sheets to maintain the latter separate from each other and sheet-releasing positions where said plates release sheets for movement out of said container, said notches being aligned with respect to each other when said plates are in said sheet-retaining positions thereof; an elongated lock bar situated in all of said notches when said plates are in said sheet-retaining positions thereof for releasably locking said plates in said sheet-retaining positions; and means operatively connected to said lock bar for shifting the latter in a direction parallel to said shaft for releasing said rings one after the other for turning movement relative to said shaft so that said plates are free to turn one after the other to release sheets for movement out of the container one after the other.

13. A dispenser as recited in claim 12 and wherein said means which is operatively connected to said bar moves the latter in a stepwise manner through increments substantially equal to the thickness of said rings so as to release said plates one after the other for movement from said sheet-retaining positions thereof.

14. A dispenser as recited in claim 13 and wherein a means is carried by said container for displacement into engagement with said means for moving said bar in a stepwise manner for rendering said latter means inoperative during loading of the container with sheets to be subsequently dispensed therefrom; and spring means operatively connected to said bar for moving the latter into said notches during loading of the container.

15. In a sheet dispensing apparatus, such as an apparatus for dispensing sheets of X-ray film from the interior of a cassette, in combination, a container adapted to contain a plurality of sheets which are to be dispensed therefrom; a shaft carried by said container and extending across the interior thereof; a plurality of rings freely turnable on said shaft, said rings having outer peripheries which are respectively formed with notches; a plurality of separator plates respectively carried by said rings for turning movement with the latter and with respect to said shaft between sheet-retaining positions where said plates extend respectively between a plurality of sheets in said container and sheet-releasing positions where said plates release sheets for movement out of said container, said notches being in alignment with each other when said plates are in said sheet-retaining positions thereof; an elongated lock bar extending parallel to said shaft and situated in said notches when said separator plates are in said retaining positions thereof for preventing turning of said rings relative to said shaft so as to maintain said plates in said retaining positions; moving means carried by said container and operatively connected to said bar for longitudinally moving the latter in a stepwise manner for releasing said rings one after the other so as to release said plates one after the other for releasing sheets for movement out of the container one after the other; receiving means for receiving said container and supporting the latter in a position where sheets are adapted to be discharged therefrom; and actuating means carried by said receiving means and cooperating with said moving means for actuating the latter to move said bar when said container is received in said receiving means.

16. In an apparatus as recited in claim 15, said actuating means including an electromagnet which initiates actuation of said moving means each time said electromagnet is energized.

17. In an apparatus as recited in claim 16, means carried by said receiving means for receiving sheets discharged from said container and for energizing said electromagnet in response to movement of the sheets from the container.

18. In an apparatus as recited in claim 17, said means carried by said receiving means for energizing said electromagnet including a pair of sheet-feeding rollers one of which moves away from the other in response to movement of a sheet between said rollers, and a switch actuated by movement of said one roller for energizing and deenergizing said electromagnet.

19. A sheet dispenser, such as a cassette from which sheets of X-ray film are adapted to be dispensed, comprising, in combination, a container adapted to contain a plurality of sheets; discharge means carried by said container for discharging sheets one after the other from the interior of said container, said discharge means including a plurality of separator plates respectively permanently supported by said container for independent pivotal movement between sheet retaining positions where said plates are situated in the interior of said container respectively between a plurality of sheets to maintain the latter separate from each other and sheet releasing positions where said plates release sheets for movement out of the interior of said container; and release means operatively connected to said plates for sequentially releasing the latter for movement from said sheet retaining to said sheet-releasing positions thereof respectively so that sheets in the container will be dispensed one after the other from the interior thereof, the released ones of said plates remaining in said sheet releasing positions thereof until all of the sheets in the container have been discharged.

20. A sheet dispenser, such as a cassette from which sheets of X-ray film are adapted to be dispensed, comprising, in combination, a container adapted to contain a plurality of sheets; and discharge means carried by said container for discharging sheets sequentially from the interior of said container, said discharge means comprising stationary support means and a plurality of separator plates pivotally carried by said stationary support means and situated between sheets in said container to separate the sheets from each other, each of said plates being pivotable sequentially with respect to said support means between a sheet retaining position and a sheet releasing position while the plates which remain in sheet retaining position remain stationary.

References Cited by the Examiner
UNITED STATES PATENTS

| | | | |
|---|---|---|---|
| 1,517,066 | 11/1924 | Hope | 221—86 |
| 2,743,842 | 5/1956 | Fry | 221—86 |

ROBERT B. REEVES, *Primary Examiner.*

HADD S. LANE, *Examiner.*